June 9, 1953 W. S. W. EDGAR, JR 2,641,651
ELECTRONIC CODE TELEGRAPH READING AND REPEATING SYSTEM
Original Filed Feb. 15, 1949
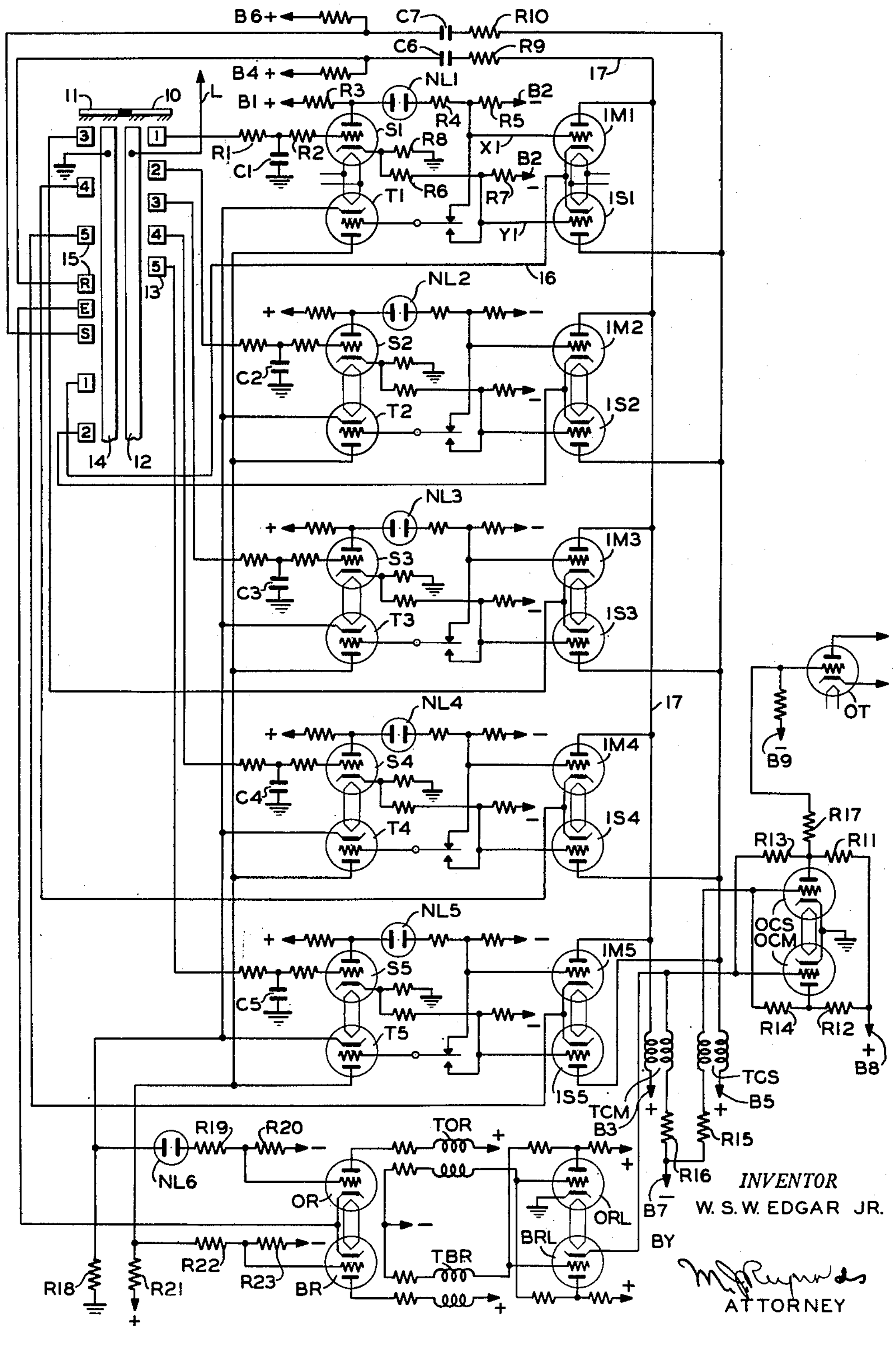
INVENTOR
W. S. W. EDGAR JR.
BY
ATTORNEY Patented June 9, 1953 2,641,651

UNITED STATES PATENT OFFICE 2,641,651

ELECTRONIC CODE TELEGRAPH READING AND REPEATING SYSTEM

William Stanley Westerman Edgar, Jr., New York, N. Y., assignor to The Western Union Telegraph Company, New York, N. Y., a corporation of New York Original application February 15, 1949, Serial No. 76,486. Divided and this application January 12, 1951, Serial No. 205,659

14 Claims. (Cl. 178—70)

This invention relates to an electronic code telegraph signal storing, reading and repeating system, and more particularly to such a system in which predetermined code impulses may be added to the code signals, if desired, and in which predetermined code signals may be identified and, if desired, eliminated from the repeated signals or utilized to perform selected functions.

The present invention is a division of my copending application Serial No. 76,486, filed February 15, 1949.

One aspect of the invention involves the conversion of multiplex signals into start-stop or similar signals. Heretofore, it has been the usual practice in converting from multiplex signals to simplex signals to use a circuit arrangement consisting of both mechanical relays and electron tubes. The present invention successfully eliminates the need for using mechanical relays and permits the conversion to be effected solely by means of electron tubes. This elimination of mechanical relays results in a lower initial cost and in an economy of installation space. It also provides lower maintenance cost and an ability to operate at far higher speeds with no sacrifice in reliability.

Thus, one of the objects of this invention is to provide an improved solely electronic means of converting multiplex signals into simplex signals.

Another object of this invention is to provide an electronic method of deleting blank signals received over the incoming circuit. This is accomplished by a plurality of reading tubes which detect blank signal codes and act upon the reception of such signals to produce a marking pulse in place of the normally inserted spacing start pulse.

Other objects and features of this invention will appear more clearly from the following description taken in connection with the accompanying drawing which diagrammatically illustrates a manner of converting multiplex signals into start-stop or simplex signals and for reading received blank signals and preventing their transmission over the outgoing simplex circuit.

Referring now to the drawing, a developed portion of the signal distributor is shown having multiplex receiving brushes 10 and simplex brushes 11 with their respectively associated common and segmented rings 12, 13 and 14, 15.

The multiplex receiving ring 13 is divided into channels of five segments each, the segments of one channel being numbered consecutively 1 through 5 and the common or solid ring 12 being connected to the incoming line L. The teleprinter timing ring 15 is also divided into segments 1 through 5, and has in addition three extra segments R, E and S. Connected to this ring by means of brushes 11 is the common grounded ring 14. Brushes 10 and 11 are fixed to rotate simultaneously at the same relative position on the distributor.

The brushes on the teleprinter timing ring are so placed that shortly after all five segments on the multiplex ring have received their impulses, the brush on the teleprinter ring will contact in sequence the segment R. E and S. Segment S is the "start" segment and it is through this segment that the spacing signal needed to start the seven-unit teleprinter code is transmitted. After leaving the S segment the brush 11 will contact in succession segments 1 to 5 of the teleprinter ring, which apply ground to tube circuits energized by the five segments on the multiplex ring as hereinafter described.

After ground has been applied to the five tube circuits controlled by the multiplex segments 1 to 5, the rest segment R is again reached on the teleprinter ring. This, as will be explained, causes a rest or marking impulse to be transmitted to the outgoing line, thus completing the last unit of the seven-unit teleprinter code. The exploratory segment E on the teleprinter ring applies ground to a tube circuit arranged to read blanks described hereinafter in detail.

The five segments of ring 13 are connected, respectively, to the grids of five receiving storage tubes S1 to S5, through series resistances R1, R2 having a grounded condenser C1 connected therebetween. Thus as each signal impulse is received on the multiplex segments it is stored in the associated condensers C1 and serves to maintain the grids of tubes S1 to S5 charged either negatively or positively in accordance with the received signal impulses. The five receiving tube circuits are identical and therefore only that associated with multiplex segment 1 will be described.

The plate of tube S1 is connected to positive battery B1 through a resistance R3 and negative battery B2 is connected thereto through a neon lamp NL1 and a voltage divider network comprising resistances R4 and R5. The cathode of tube S1 is connected to ground through resistance R8 and to negative battery B2 through a voltage divider network comprising resistances R6 and R7.

The tube S1 determines the operation of either one of two tubes IM1 and IS1 depending upon the operative or inoperative condition of tube S1. For this purpose the grid of tube IM1 is connected between the voltage divider resistances R4 and R5 associated with the plate of tube S1 and the grid of tube IS1 is similarly connected between the resistances R6 and R7 associated with the cathode of tube S1. The cathodes of tubes IM1 and IS1 are connected to the number 1 segment of the simplex ring 15 over conductor 16 and the cathodes of the remaining tubes IM2 to IM5 and IS2 to IS5 are similarly connected, respectively, to the simplex segments 2 to 5 of ring 15. The anodes of tubes IM1 to IM5 are connected in parallel through the primary winding of a transformer TCM to positive battery B3. The primary of transformer TCM is also connected through a condenser C6, a resistance R9 and conductor 17 to the rest segment R of the simplex distributor ring. The condenser C6 is normally retained uncharged by the positive battery B4 connected to the opposite plate thereof from battery B3 and as a result of which whenever the simplex brush 11 grounds segment R, charging current flows from the condenser C6 through the primary of transformer TCM, to thereby transmit a rest impulse to line, as will subsequently appear. The signals consecutively received on the multiplex segments 1 through 5 of ring 13 have either a positive or a negative polarity, depending on whether spacing or marking signals are being received from the line. The circuit is arranged to operate with a negative marking condition and a positive spacing condition. By switching the lead X1, connected to the grid of tube IM1 with the lead Y1 connected to the grid of the tube IS1, this circuit will work from a multiplex channel that marks on positive battery. For the sake of simplicity we will describe the circuit as it is set up, i. e., arranged to operate from a multiplex channel which marks on negative battery.

It should be noted that although only one channel of five multiplex segments of ring 13 and the corresponding teleprinter segments of ring 15 are depicted on the circuit diagram, any number of channels, consistent with limitations of space, may be provided.

The operation of the circuit for the channel shown will be described and this description will suffice for any number of channels. For this purpose an arbitrary combination of signals received over the first channel will be selected. Assume that the combination selected consists of impulses conventionally stated as marking, spacing, spacing, marking, marking or impulses which are —++——. This is letter B of the Baudot code.

Such being the case, the first received impulse will be a negative or marking signal on the common ring 12 from which it will be applied through multiplex segment 1 of ring 13 to the storage condenser C1. It is necessary to store the Baudot code units long enough to enable the starting pulse, which will be described in detail below, to initiate transmission of the received code over the teleprinter line. This is accomplished in part by making the discharge path of the condenser to the grid of tube S1 of such high resistance that the condenser will hold its charge for one revolution. The resistance R2 serves this purpose. The resistance R1 is a protective device for segment 1 of ring 13 from the residual charge on condenser C1.

The negative impulse coming from segment 1 places a negative potential on the grid of tube S1 so that this tube will remain unoperated. It will be recalled that the potential on the grid of tube IM1 is regulated by the connection from the anode of the tube S1 to the grid of the tube IM1; and the potential across the grid of the tube IS1 is regulated by the connection between the cathode of the tube S1 and the grid of the tube IS1. With the tube S1 in a non-conducting condition the voltage divider network operates in the following manner. A positive potential from battery connection B1 will be applied through resistor R3, the neon lamp NL1 and resistor R4 to the grid of tube IM1. This positive potential will be of sufficient value to cancel out the negative potential coming from battery connection B2 through resistor R5 and to apply the proper positive potential to the grid of tube IM1. However, at this time the cathode circuit of tube IM1 is open at the simplex segment 1 of ring 15.

With tube S1 non-conducting, as stated, the grid of tube IS1 receives a negative potential from battery connection B2 through resistor R7 making tube IS1 also non-conducting.

The multiplex brush next makes contact with segment 2 on the multiplex receiving ring 13 and a positive charge is stored on the condenser C2 associated with this segment as in the circuit described above. This being a positive signal, however, it causes the grid of tube S2 to be driven positive thus making the tube conducting and thereby providing a shunt path from battery B1 to the grid of tube IS2, thus rendering this tube positive and causing the grid of tube IM2 to be charged negatively from battery B2. Tube IS2 thus becomes conditioned for operation upon the completion of its cathode circuit through simplex segment 2 of ring 15.

After a pulse, of either negative or positive polarity, has been stored in all five circuits connected to segments 1 to 5 of the multiplex receiving ring 13, to condition one or the other of each pair of tubes IM1 to IM5 and IS1 to IS5, the brush 11 passes over segments R and E, the purpose of which will be hereinafter described and then makes contact with the starting segment S. Thus, a ground is applied from segment S to one side of condenser C7. This results in a pulse through the primary winding of transformer TCS and resistance R10, to the ungrounded side of condenser C7. As brush 11 moves from segment S, ground is removed from this segment causing a potential to be induced in the secondary winding of transformer TCS, in opposition to the negative battery B7, thereby making the grid of a tube OCS positive and rendering the tube conducting.

The tube OCS is connected to the tube OCM in a conventional "trigger circuit" which operates on the principle that only one tube at a time may pass plate current. Thus the plate potential for tubes OCS and OCM is supplied from battery B8 through the resistances R11 and R12 respectively, and the grid of each tube is provided with a positive bias from the plate potential of the other tube, through limiting resistances R13 and R14, respectively. An opposing negative potential is supplied to the grid of tube OCS from battery B7, resistance R15 and the secondary winding of transformer TCS. Likewise, the grid of tube OCM is connected to negative battery B7 through resistance R16 and the secondary winding of transformer TCM.

Normally, with no signals being transmitted the marking tube OCM will be conducting and will shunt out the positive biasing potential for tube OCS so that the grid of this tube is held negative by battery B7.

An output tube OT having its grid also connected through resistances R11 and R17 to the positive battery B8, in opposition to its negative grid bias B9, is conducting at this time.

However, upon the generation of a positive pulse through transformer TCS by the start segment S, as described, the grid of tube OCS is driven strongly positive and it becomes conducting, extinguishing tube OCM. The operation of tube OCS shunts out the positive grid bias for the output tube OT and this tube becomes non-conducting thereby transmitting a start or spacing signal to line. Thus, the space signal necessary to start the teleprinter code is transmitted and it is now time to transmit the five code impulses of the received character signal. The brush 11 on the teleprinter timing ring 15 now moves on the ring for a space equal to one impulse period and contacts segment 1. Thus a ground is supplied over conductor 16 to the cathodes of the tubes IM1 and IS1. In the example assumed, as will be recalled, the grid of tube IM1 was made positive due to the negative charge stored in condenser C1. With the ground thus applied, tube IM1 becomes conducting and sends a pulse through the primary winding of transformer TCM. The secondary winding of this transformer receives the pulse through normal transformer action and applies the resulting positive potential to the grid of tube OCM. This positive potential causes tube OCM to conduct and by virtue of the trigger circuit, explained above, tube OCS becomes non-conducting. The circuit is arranged, through the shown resistors, so that when tube OCM is conducting, a positive potential of sufficient strength to operate the output tube OT is applied to the grid of this tube which thereby marks the teleprinter line. In a like manner, the four remaining impulses of the code are transmitted to the teleprinter line.

After the ground has been applied to the fifth segment of ring 15 to transmit the final impulse of the code signal, it contacts rest segment R. This segment reacts in the same manner as segment S by grounding condenser C6. This condenser, however, is connected to the primary winding of transformer TCM, instead of transformer TCS. Therefore, the secondary winding of transformer TCM will apply a positive potential across the grid of tube OCM and, by virtue of the trigger circuit action, the output tube OT will mark the teleprinter line. This completes the transfer of the five-unit multiplex code into the seven-unit, start-stop or teleprinter code. It should be noted that the segments on the teleprinter timing ring are so oriented that, for example, while a ground is applied to the circuits of segments 3 and 4 of the teleprinter ring, segments 1 and 2 of the multiplex ring are receiving their next signal impulse.

The circuit as described above would also transmit to the teleprinter line each blank or all spacing signal received, since it would be stored in the condensers connected to the tubes S1 to S5 as positive potentials and therefore would space the teleprinter line the same as any other signal. To prevent repetition of these blank signals over the teleprinter line, a way has been devised by which tube OCS will not be able to conduct despite the positive potential imposed upon its grid by the spacing signal combination. This is accomplished by applying a large positive bias on the grid of tube OCM thus "locking" the trigger circuit.

This locking process operates in the following manner. In order to perform the blank reading function each tube S1 to S5, either through its cathode or anode, controls the grid of a comparison tube T1 to T5. All of the tubes T1 to T5 have common plate and cathode resistors R21 and R18, respectively. Resistances R19 and R20 and neon lamp NL6 form a voltage divider network connected to the grid of tube OR. Likewise the resistances R22 and R23 form a voltage divider network connected to the grid of tube BR. The grids of tubes T1 to T5 are connected to the grids of the corresponding tubes IM1 to IM5 so as to respond to received marking and spacing signals in the same manner as tubes IM1 to IM5.

If all of the condensers connected to the grids of tubes S1 to S5 receive a positive charge (i. e., a blank or all spacing signal is registered) none of tubes T1 to T5 will become conducting. This occurs as a result of the positive charge being placed on the grids of tubes S1 to S5 thus rendering each of the tubes S1 to S5 conducting. Hence, a positive potential is applied from battery connection B1 through R3 and R6 to the grids of each of the tubes IS and consequently a negative potential is applied to all of the tubes IM1 to IM5 and T1 to T5 from battery connection B2, through resistance R5.

Thus with all five of the tubes T1 to T5 non-conducting, the voltage divider networks are so connected to the grids of tubes OR and BR as to regulate those tubes in the following manner:

A positive potential is normally applied to the grid of tube BR through resistances R21 and R22. Resistances R21, R22 and R23 are so selected that, with tubes T1 to T5 non-conducting, this positive potential will be greater than the negative potential applied at the terminal of resistance R23, and the grid of tube BR will thereby be maintained positive. At the same time, the grid of tube OR will be maintained negative due to the negative potential from battery at the terminal of resistance R20. In order for tube OR or BR to pass current, a ground must be applied to the cathodes of the two tubes. This is accomplished by the exploratory segment E on the teleprinter ring. After the five impulses are stored on condensers C1 to C5 and before starting segment S is reached, the brush 11 reaches exploratory segment E which grounds the cathodes of tubes OR and BR.

Since the grid of tube BR is positive, it becomes conducting causing a current flow through the primary winding of transformer TBR which thus induces a positive pulse in its secondary winding from where it is transmitted to the grid of tube BRL. Tubes BRL and ORL are connected in a conventional "trigger circuit" just as tubes OCS and OCM were. Because of the characteristics of such a circuit, explained above, when the grid of tube BRL received a positive charge from the secondary winding of transformer TBR, it becomes conducting and tube ORL becomes non-conducting.

A high positive potential thus flows from tube BRL to the grid of tube OCM. This high positive potential on the grid of OCM will prevent the smaller positive potential on the grid of tube OCS from working the trigger circuit (i. e., making tube OCM non-conducting) and hence the circuit locks and no change is sent to the output tube controlling the teleprinter line, and therefore the received blank signal is not transmitted. Tube BRL continues to operate and block transmission of spacing impulses over the outgoing line until a character other than blank is received from the multiplex line.

When a character other than blank is received, one or more of the five condensers C1 to C5 connected to the tubes S1 to S5 will receive a marking pulse and will result in one of the tubes T1 to T5 becoming conducting. Thus, with any one of the tubes T1 to T5 conducting, the voltage drop occurring through resistance R21 causes the negative battery at the terminal of resistance R23 to predominate so as to drive the grid of tube BR negative and the positive potential impressed through one or more of the operating tubes T1 to T5, neon lamp L6 and resistance R19 predominates over the negative potential from the terminal of resistance R20 so that the grid of tube OR is driven positive.

Thus, when the ground is applied at segment E, tube OR becomes conducting causing current flow through the primary winding of transformer TOR and inducing a positive charge in the secondary winding of TOR. Tube ORL thus receives a positive grid potential, making it conducting. It thereby operates the trigger circuit which extinguishes tube BRL and interrupts the high positive bias to the grid of tube OCM. The trigger circuit, made up of tubes OCM and OCS, is thus allowed to function normally.

Thus, it will be noted, a purely electronic arrangement has been provided for converting multiplex signals into simplex or start-stop signals and for eliminating blank signals from retransmission.

While the invention has been described in a particular use thereof and in a particular embodiment, it is not desired that it be limited thereto for obvious modifications thereof will occur to those skilled in the art without departing from the spirit and scope of the invention as set forth in the appended claims.

What is claimed is:

1. Apparatus for repeating permutation code telegraph signals having a uniform number of selecting impulses of marking and spacing conditions from an incoming circuit, comprising a plurality of receiving electronic devices, one individual to each unit of the permutation code signals, each of said receiving devices having an input circuit and an output circuit, a distributor for applying the signal impulses received over said incoming circuit selectively to the input circuits of said receiving electronic devices thereby selectively to render said receiving electronic devices conductive and non-conductive in accordance with said signal impulses, a pair of electronic selector devices individual to each of said receiving devices, each of said selector devices having an input circuit and an output circuit, means intercoupling the output circuits of said receiving electronic devices and the respective input circuits of the corresponding pairs of electronic selector devices in such manner that one of the electronic devices in each pair of selector devices is in conductive condition only when the corresponding receiving electronic device is conducting and the other electronic device in each pair of selector devices is in conductive condition only when the corresponding receiving electronic device is non-conducting, and means to derive from the output circuits of said electronic selector devices a permutation code telegraph signal corresponding to said received signal impulses.

2. Apparatus for repeating permutation code telegraph signals having a uniform number of selecting impulses of marking and spacing conditions from an incoming circuit, comprising a plurality of receiving electron discharge tubes one individual to each unit of the permutation code signals, each of said tubes having an input circuit and an output circuit, a distributor for applying the signal impulses received over said incoming circuit selectively to the input circuits of said receiving tubes thereby selectively to render said receiving tubes conductive and non-conductive in accordance with the polarity of said signal impulses, a pair of selector electron discharge tubes individual to each of said receiving tubes each having an input circuit and an output circuit, means intercoupling the output circuits of said receiving tubes and the respective input circuits of the corresponding pairs of selector tubes in such manner that one of tubes in each pair of selector tubes is in conductive condition only when the corresponding receiving tube is conducting and the other tube in each pair of selector tubes is in conductive condition only when the corresponding receiving tube is non-conducting, and means to derive from the output circuits of said selector tubes a permutation code telegraph signal corresponding to said received signal impulses.

3. Apparatus for repeating permutation code telegraph signal impulses from an incoming circuit, comprising a plurality of receiving electron discharge tubes each having an input circuit and an output circuit, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and an output circuit, a plurality of voltage divider networks each intercoupling the output circuit of a respective one of said receiving tubes and the respective input circuits of the corresponding pairs of selector tubes, said voltage divider networks being arranged in such manner that one of the tubes in each pair of selector tubes is in conductive condition only when the corresponding receiving tube is conducting and the other tube in each pair of selector tubes is in conductive condition only when the corresponding receiving tube is non-conducting, and means to derive from the output circuits of said selector tubes a permutation code telegraph signal corresponding to said received signal impulses.

4. Apparatus for repeating permutation code telegraph signal impulses from an incoming circuit, comprising a plurality of receiving electron discharge tubes each having an input circuit and an output circuit, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a plurality of voltage divider networks each intercoupling the output circuit of a respective one of said receiving tubes and the respective input circuits of the corresponding pair of selector tubes, said voltage divider networks being arranged in such manner that one of the tubes in each pair of selector tubes is in conductive condition only when the corresponding receiving tube is conducting and the other tube in each pair of selector tubes is in conductive condition only when the corresponding receiving tube is non-conducting, means for completing the output circuits of each pair of selector tubes in sequential order, signal repeating means associated with the output circuits of said selector tubes and selectively responsive to the operation of said pairs of selector tubes, and means to derive from said repeating means a permutation code telegraph signal corresponding to said received signal impulses.

5. Apparatus for repeating permutation code telegraph signal impulses from an incoming circuit, comprising a plurality of receiving electron discharge tubes each having an input circuit and an output circuit, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a plurality of voltage divider networks each intercoupling the output circuit of a respective one of said receiving tubes and the respective input circuits of the corresponding pair of selector tubes, said voltage divider networks being arranged in such manner that one of the tubes in each pair of selector tubes is in conductive condition only when a positive signal impulse is applied to the input circuit of the corresponding receiving tube and the other tube in each pair of selector tubes is in conductive condition only when a negative signal impulse is applied to the input circuit of the corresponding receiving tube, means for completing the output circuits of each pair of selector tubes in sequential order, signal repeating means associated with the output circuits of said selector tubes and selectively responsive to the operation of said pairs of selector tubes, and means to derive from said repeating means a permutation code telegraph signal corresponding to said received signal impulses.

6. Apparatus for repeating permutation code telegraph signal impulses from an incoming circuit, comprising a plurality of receiving electron discharge tubes each having an input circuit intercoupling the grid and cathode electrodes of the respective receiving tubes and an output circuit intercoupling the anode and cathode electrodes of the respective receiving tubes, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a first plurality of voltage divider networks each intercoupling the input circuit of one of the tubes in each of said pairs of selector tubes and the anode electrodes of the respective receiving tubes thereby to place said one tube in each of said pairs in conductive condition solely when a negative impulse is applied to the input circuit of the corresponding receiving tubes, a second plurality of voltage divider networks each intercoupling the input circuits of the other tubes in each of said pairs of selector tubes and the cathode electrodes of the respective receiving tubes thereby to place said other tube in each of said pairs in conductive condition solely when a positive impulse is applied to the input circuit of the corresponding receiving tube, means for completing the output circuits of each pair of selector tubes in sequential order, signal repeating means associated with the output circuits of said selector tubes and selectively responsive to the operation of said pairs of selector tubes, and means to derive from said repeating means a permutation code telegraph signal corresponding to said received signal impulses.

7. Apparatus for repeating permutation code telegraph signal impulses from an incoming circuit, comprising a plurality of receiving electron discharge tubes each having an input circuit and output circuit, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a plurality of voltage divider networks each intercoupling the output circuit of a respective one of said receiving tubes and the respective input circuits of the corresponding pair of selector tubes, said voltage divider networks being arranged in such manner that one of the tubes in each pair of selector tubes is in conductive condition only when a positive signal impulse is applied to the input circuit of the corresponding receiving tube and the other tube in each pair of selector tubes is in conductive condition only when a negative signal impulse is applied to the input circuit of the corresponding receiving tube, means for completing the output circuits of each pair of selector tubes in sequential order, a signal repeating circuit including a pair of signal repeating electron discharge tubes, one of said repeating tubes being associated in common with the output circuits of one of the tubes in each of said pairs of selector tubes and the other repeating tube being associated in common with the output circuits of the other of the tubes in each of said pairs of selector tubes whereby one of said repeating tubes is rendered conductive solely when one of said tubes of said pairs of selector tubes is conductive and the other of said repeating tubes is rendered conductive solely when one of said other tubes of said pairs of selector tubes is conductive, said repeating tubes being arranged in trigger relationship whereby conduction of one repeating tube causes a discontinuance of the conduction of the other repeating tube, and means to derive from said repeating circuit a permutation code telegraph signal corresponding to said received signal impulses.

8. Apparatus for repeating permutation code telegraph signal impulses from an incoming circuit, comprising a plurality of receiving electron discharge tubes each having an input circuit intercoupling the grid and cathode electrodes of the respective receiving tubes and an output circuit intercoupling the anode and cathode electrodes of the respective receiving tubes, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a first plurality of voltage divider networks each intercoupling the input circuit of one of the tubes in each of said pairs of selector tubes and the anode electrodes of the respective receiving tubes thereby to place said one tube in each of said pairs in conductive condition solely when a negative impulse is applied to the input circuits of the corresponding receiving tubes, a second plurality of voltage divider networks each intercoupling the input circuits of the other tubes in each of said pairs of selector tubes and the cathode electrodes of the respective receiving tubes thereby to place said other tubes in each of said pairs in conductive condition solely when a positive impulse is applied to the input circuit of the corresponding receiving tube, means for completing the output circuits of each pair of selector tubes in sequential order, a signal repeating circuit including a pair of signal repeating electron discharge tubes, one of said repeating tubes being associated in common with the output circuits of said one tubes in each of said pairs of selector tubes and the other repeating tube being associated in common with the output circuits of said other tubes in each of said pairs of selector tubes, whereby said one of said selector tubes is rendered conductive solely when one of said one tubes of said pairs of selector tubes is conductive and the other of said repeating tubes is rendered conductive solely when one of said other tubes of said pairs of selector tubes is conductive, said repeating tubes being arranged in trigger relationship whereby conduction of one repeating tube causes a discontinuance of conduction of the other repeating tube, and means selectively responsive to the conduction of said repeating tubes to derive from said repeating circuit a permutation code telegraph signal corresponding to said received signal impulses.

9. Apparatus for repeating permutation code telegraph signal impulses from an incoming circuit, comprising a plurality of receiving electron discharge tubes each having an input circuit and an output circuit, a first distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a plurality of voltage divider networks each intercoupling the output circuit of a respective one of said receiving tubes and the respective input circuits of the corresponding pair of selector tubes, said voltage divider networks being arranged in such manner that one of the tubes in each pair of selector tubes is in conductive condition only when a positive signal impulse is applied to the input circuit of the corresponding receiving tube and the other tube in each pair of selector tubes is in conductive condition only when a negative signal impulse is applied to the input circuit of the corresponding receiving tube, signal repeating means associated with the output circuits of said selector tubes and selectively responsive to the operation of said pairs of selector tubes, means including a second distributor for sequentially generating and transmitting to said repeating means a start signal indication, completing the output circuits of each pair of selector tubes in sequential order and generating and transmitting to said repeating means a rest signal indication, and means to derive from said repeating means a permutation code telegraph signal corresponding to said received signal impulses and having start and rest signal impulses.

10. Apparatus for repeating permutation code marking and spacing telegraph signal impulses from an incoming line and for preventing repetition of signals constituted solely by spacing impulses, comprising a plurality of receiving electron discharge tubes each having an input circuit and an output circuit, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a plurality of voltage divider networks each intercoupling the output circuit of a respective one of said receiving tubes and the respective input circuits of the corresponding pairs of selector tubes, said voltage divider networks being arranged in such manner that one of the tubes in each pair of selector tubes is in conductive condition only when the corresponding receiving tube is conducting and the other tube in each pair of selector tubes is in conductive condition only when the corresponding receiving tube is non-conducting, means for completing the output circuits of each pair of selector tubes in sequential order, signal repeating means associated with the output circuits of said selector tubes and selectively responsive to the operation of said pairs of selector tubes, means to suppress operation of said signal repeating means when said received signal impulses are constituted solely of spacing impulses comprising a plurality of reading electron discharge tubes each having an input circuit coupled to a respective one of the output circuits of said receiving tubes and having an output circuit, each of said reading tubes having a conductive condition and a non-conductive condition, the coupling of the input circuits of said reading tubes to the respective output circuits of said receiving tubes being arranged in such manner that said reading tubes are caused to assume one of said conditions upon application of spacing impulses to the input circuits of the associated receiving tubes and means operative when all of said reading tubes are in said one of said conditions to prevent operation of said signal repeating means, and means to derive from said repeating means a permutation code telegraph signal corresponding to said received marking and spacing telegraph signal impulses.

11. Apparatus for repeating permutation code negative and positive telegraph signal impulses from an incoming line and for preventing repetition of signals constituted solely by spacing impulses, comprising a plurality of receiving electron discharge tubes each having an input circuit and an output circuit, a distributor for applying the signal impulses received over said incoming circuit selectively to the input circuits of said receiving tubes thereby selectively to render said receiving tubes conductive and non-conductive in accordance with the polarity of said signal impulses, a plurality of pairs of selector electron discharge tubes each having an input circuit and a normally open output circuit, a plurality of voltage divider networks each intercoupling the output circuit of a respective one of said receiving tubes and the respective input circuits of the corresponding pairs of selector tubes, said voltage divider networks being arranged in such manner that one of the tubes in each pair of selector tubes is in conductive condition only when the receiving tube is conducting and the other tube in each pair of selector tubes is in conductive condition only when the corresponding receiving tube is non-conducting, means for completing the output circuits of each pair of selector tubes in sequential order, signal repeating means associated with the output circuits of said selector tubes and selectively responsive to the operation of said pairs of selector tubes, means to suppress operation of said signal repeating means when said received signal impulses are constituted solely of positive impulses comprising a plurality of reading electron discharge tubes each having an input circuit coupled to a respective one of the output circuits of said receiving tubes and having an output circuit, each of said reading tubes having a conductive condition and a non-conductive condition, the coupling of the input circuits of said reading tubes to the respective output circuits of said receiving tubes being arranged in such manner that said reading tubes are caused to assume said non-conductive condition upon conduction of the associated receiving tube and means operative when all of said reading tubes are in said non-conductive condition to prevent operation of said signal repeating means, and means operative when said reading tubes are not all in said non-conductive condition to derive from said repeating means a permutation code telegraph signal corresponding to said received telegraph signal impulses.

12. Apparatus for repeating permutation code telegraph signal impulses from an incoming circuit, comprising a plurality of receiving electronic systems each having an input circuit and an output circuit, a distributor for applying the signal impulses received over said incoming circuit selectively to the input circuits of said receiving systems thereby selectively to render said receiving systems conductive and non-conductive in accordance with the polarity of said signal impulses, a plurality of pairs of selector electronic systems each having an input circuit and a normally open output circuit, a plurality of voltage divider networks each intercoupling the output circuit of a respective one of said receiving systems and the respective input circuits of the corresponding pair of selector systems, said voltage divider networks being arranged in such manner that one of the systems in each pair of selector systems is in conductive condition only when a positive signal impulse is applied to the input circuit of the corresponding receiving system and the other system in each pair of selector systems is in conductive condition only when a negative signal impulse is applied to the input circuit of the corresponding receiving system, means for completing the output circuits of each pair of selector systems in sequential order, signal repeating means associated with the output circuits of said selector systems and selectively responsive to the operation of said pairs of selector system, and means to derive from said repeating means a permutation code telegraph signal corresponding to said received signal impulses.

13. Apparatus for receiving permutation code telegraph signal groups having a uniform number of selecting impulses of marking and spacing conditions, comprising a receiving electronic device individual to each unit of a signal group, each of said devices having an input circuit and an output circuit, means for distributing the impulses of each signal group to the input circuits of said receiving devices in sequential order to render said receiving devices selectively conducting or non-conducting in accordance with the marking or spacing condition of said signal impulses, means for maintaining said receiving devices in said conducting or non-conducting condition after cessation of said signal impulses, electronic means individual to each of said receiving devices, each of said electronic means having an input circuit coupled to the output circuit of its corresponding receiving device for operation selectively in accordance with the conducting or non-conducting condition of its corresponding receiving device, a normally open output circuit for each of said electronic means, means for closing said output circuits in sequential order and in timed relation to the distribution of the signal impulses to the corresponding receiving device and means for deriving telegraph code signal groups from the output circuits of said electronic means.

14. Apparatus for receiving permutation code telegraph signal groups having a uniform number of selecting impulses of marking and spacing conditions, comprising a receiving electronic device individual to each unit of a signal group, each of said devices having an input circuit and an output circuit, means for distributing the impulses of each signal group to the input circuits of said receiving devices in sequential order to render said receiving devices selectively conducting or non-conducting in accordance with the marking or spacing condition of said signal impulses, means for maintaining said receiving devices in said conducting or non-conducting condition after cessation of said signal impulses, electronic means individual to each of said receiving devices, each of said electronic means having an input circuit coupled to the output circuit of its corresponding receiving device for operation selectively in accordance with the conducting or non-conducting condition of its corresponding receiving device, a normally open output circuit for each of said electronic means, means for closing said output circuits in sequential order and in timed relation to the distribution of the signal impulses to the corresponding receiving device, means for deriving telegraph code signal groups from the output circuits of said electronic means and means for interposing supplemental signal impulses between successive derived code signal groups.

WILLIAM STANLEY
WESTERMAN EDGAR, JR.

References Cited in the file of this patent

UNITED STATES PATENTS

| Number | Name | Date |
|---|---|---|
| 2,365,450 | Bliss | Dec. 19, 1944 |
| 2,465,185 | Anderson | Mar. 22, 1949 |

FOREIGN PATENTS

| Number | Country | Date |
|---|---|---|
| 840,607 | France | Jan. 23, 1939 |